(12) United States Patent
Ding et al.

(10) Patent No.: US 11,175,493 B2
(45) Date of Patent: Nov. 16, 2021

(54) LENS MODULE

(71) Applicant: TRIPLE WIN TECHNOLOGY (SHENZHEN) CO. LTD., Shenzhen (CN)

(72) Inventors: Sheng-Jie Ding, Guangdong (CN); Shin-Wen Chen, New Taipei (TW); Jing-Wei Li, Guangdong (CN); Jian-Chao Song, Guangdong (CN); Shuai-Peng Li, Shenzhen (CN)

(73) Assignee: TRIPLE WIN TECHNOLOGY (SHENZHEN) CO. LTD., Shenzhen (CN)

( * ) Notice: Subject to any disclaimer, the term of this patent is extended or adjusted under 35 U.S.C. 154(b) by 223 days.

(21) Appl. No.: 16/438,654

(22) Filed: Jun. 12, 2019

(65) Prior Publication Data
US 2020/0348509 A1 Nov. 5, 2020

(30) Foreign Application Priority Data
Apr. 30, 2019 (CN) .......................... 201910364831.X

(51) Int. Cl.
*G02B 26/08* (2006.01)
*H04N 5/225* (2006.01)
(Continued)

(52) U.S. Cl.
CPC ..... *G02B 26/0883* (2013.01); *G02B 26/0816* (2013.01); *H04N 5/2253* (2013.01);
(Continued)

(58) Field of Classification Search
CPC ............ G02B 26/0883; G02B 26/0816; H04N 5/2254; H04N 5/2257; H04N 5/2253; H04N 5/374; H04N 5/372
See application file for complete search history.

(56) References Cited

U.S. PATENT DOCUMENTS

| 9,020,334 B1 * | 4/2015 | Suzuka | G02B 27/646 |
| | | | 396/55 |
| 2010/0026878 A1 * | 2/2010 | Seo | G02B 15/173 |
| | | | 348/345 |

(Continued)

FOREIGN PATENT DOCUMENTS

| CN | 203136024 U | 8/2013 |
| CN | 104519265 A | 4/2015 |

(Continued)

*Primary Examiner* — Euncha P Cherry
(74) *Attorney, Agent, or Firm* — ScienBiziP, P.C.

(57) ABSTRACT

A camera module includes a lens base, a lens group, and a switching mechanism. The lens base defines a through hole. The lens group is received within the through hole. The switching mechanism includes a switching base, an optical path conversion member, and a driving member. The switching base is mounted on the lens base and defines a light guide cavity communicating with the through hole. The switching base defines a front aperture and a rear aperture. The front aperture and the rear aperture communicate with the light guide cavity. The optical path conversion member includes a reflective surface. The driving member is mounted within the light guide cavity. The driving member drives the optical light conversion member to rotate to cause the reflective surface to reflect light entering through the front aperture or the rear aperture to the lens group.

16 Claims, 4 Drawing Sheets

(51) Int. Cl.
*H04N 5/374* (2011.01)
*H04N 5/372* (2011.01)

(52) U.S. Cl.
CPC ......... *H04N 5/2254* (2013.01); *H04N 5/2257* (2013.01); *H04N 5/372* (2013.01); *H04N 5/374* (2013.01)

(56) References Cited

U.S. PATENT DOCUMENTS

2018/0109660 A1    4/2018  Yoon et al.
2018/0364450 A1*  12/2018  Lee ..................... G02B 7/021

FOREIGN PATENT DOCUMENTS

| CN | 104977712 A | 10/2015 |
| CN | 107483676 A | 12/2017 |
| CN | 107942605 A |  4/2018 |
| CN | 208691398 U |  4/2019 |

\* cited by examiner

LENS MODULE

FIELD

The subject matter herein generally relates to lens modules, and more particularly to a lens module for performing front and rear imaging functions.

BACKGROUND

Generally, consumer electronic devices equipped with a camera include a front camera and a rear camera. There are several electronic devices on the market that can realize front and rear camera switching by rotating a single camera module. However, as the camera module rotates, a flexible printed circuit (FPC) board rotates with it, which has a risk of line breakage inside the FPC board.

BRIEF DESCRIPTION OF THE DRAWINGS

Implementations of the present disclosure will now be described, by way of embodiments, with reference to the attached figures.

DETAILED DESCRIPTION

Figure 1:
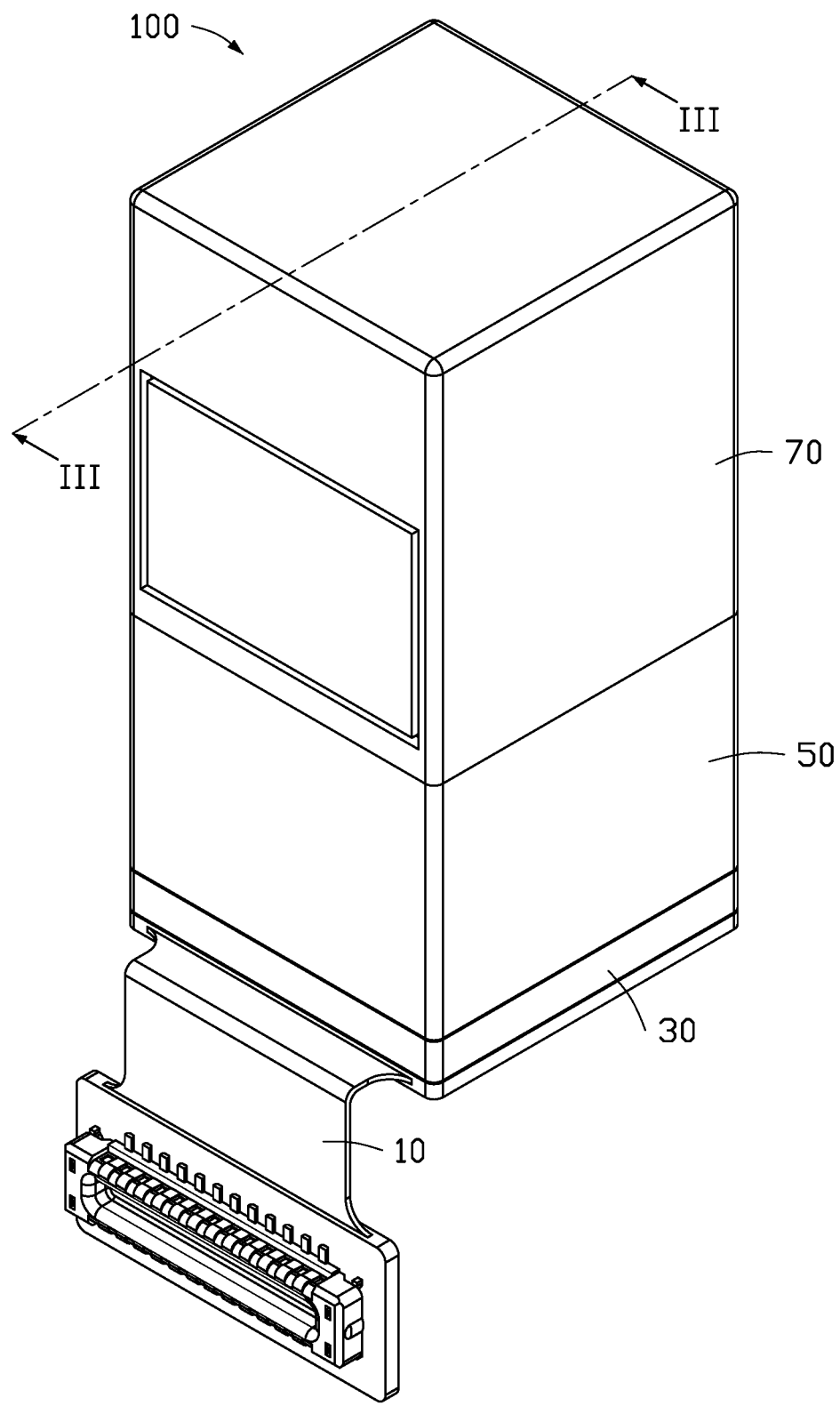
FIG. 1 is an assembled, isometric view of an embodiment of a camera module.

It will be appreciated that for simplicity and clarity of illustration, where appropriate, reference numerals have been repeated among the different figures to indicate corresponding or analogous elements. Additionally, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "substantially" is defined to be essentially conforming to the particular dimension, shape, or other word that "substantially" modifies, such that the component need not be exact. For example, "substantially cylindrical" means that the object resembles a cylinder, but can have one or more deviations from a true cylinder. The term "comprising" means "including, but not necessarily limited to"; it In one embodiment indicates open-ended inclusion or membership in a so-described combination, group, series and the like.

Figure 2:
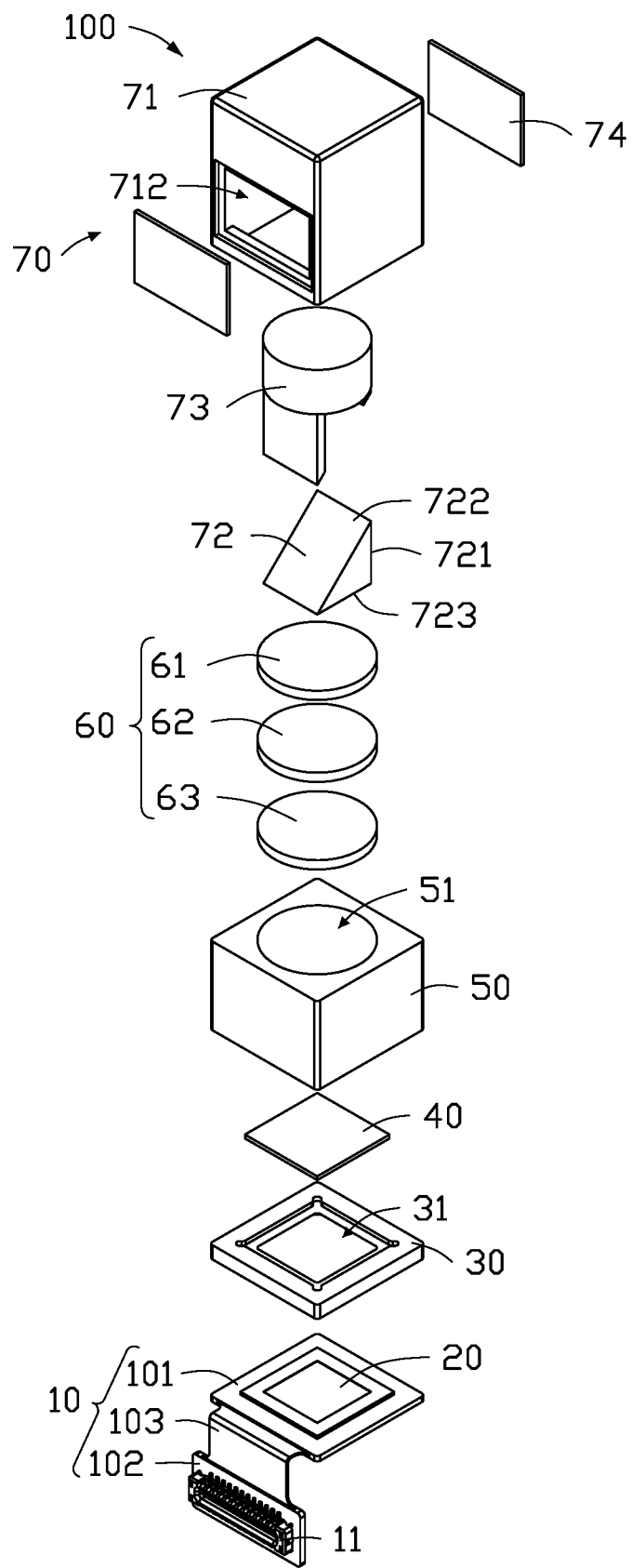
FIG. 2 is an exploded, isometric view of the camera module in FIG. 1.

FIG. 1 and FIG. 2 show an embodiment of a camera module 100. The camera module 100 includes a circuit board 10, a photosensitive chip 20, a substantially hollow mounting bracket 30, a filter 40, a substantially hollow lens base 50, a lens group 60, and a switching mechanism 70.

The photosensitive chip 20 is disposed on one surface of the circuit board 10 by a glue layer (not shown). In one embodiment, a size of the glue layer is equivalent to a size of the photosensitive chip 20. A material of the glue layer may be black glue or optical glue. In one embodiment, the circuit board 10 is a ceramic substrate, a soft board, a hard board, or a soft and hard combination board. In one embodiment, the circuit board 10 is a soft and hard combination board and includes a first hard board portion 101, a second hard board portion 102, and a soft board portion 103. The soft board portion 103 is coupled between the first hard board portion 101 and the second hard board portion 102. The photosensitive chip 20 is mounted to the first hard board portion 101. A plurality of electronic components (not shown) and a gold finger (not shown) are mounted on a surface of the first hard board portion 101 where the photosensitive chip 20 is mounted. The electronic components can be disposed around the photosensitive chip 20. The photosensitive chip 20 is electrically coupled to the electronic components and the gold finger. In one embodiment, the photosensitive chip 20 is a complementary metal-oxide semiconductor (CMOS) chip or a charge coupled device (CCD) chip. The electronic components may be passive components such as resistors, capacitors, diodes, transistors, relays, or an electrically-erasable programmable read-only memory (EEPROM).

An electrical connection portion 11 is mounted on one surface of the second hard board portion 102. The electrical connection portion 11 may be located on an opposite surface of the circuit board 10 as the electronic components and the gold finger. In one embodiment, the electrical connection portion 11 can be a connector or a gold finger.

The mounting bracket 30 is mounted to the circuit board 10 by a hollow glue layer. In one embodiment, the mounting bracket 30 is substantially square, and a receiving hole 31 is defined through the mounting bracket 30. A width of the receiving hole 31 is larger than a width of the photosensitive chip 20, and the photosensitive chip 20 is received in the receiving hole 31.

The filter 40 is mounted over the receiving hole 31 by a hollow glue layer. The filter 40 is disposed facing the photosensitive chip 20, and the filter 40 and the circuit board 10 respectively cover opposite sides of the receiving hole 31.

In one embodiment, the filter 40 is an infrared cut filter which is optically coated with a high refractive index optical film on an optical substrate by a precision optical coating technique to produce a visible light region (400-630 nm) and near-infrared region (700-1100 nm) cut-off optical filter.

The lens base 50 is mounted to a surface of the mounting bracket 30 facing away from the circuit board 10 by an adhesive layer. The lens base 50 is substantially square and defines a through hole 51 passing through the lens base 50. The through hole 51 is aligned with the receiving hole 31. In one embodiment, the lens base 50 can be a voice coil motor or a bracket.

The lens group 60 is mounted and received in the through hole 51 of the lens base 50. The lens group 60 is aligned with the photosensitive chip 20. The lens group 60 includes a plurality of lenses. In one embodiment, the lens group 60 includes a first lens 61, a second lens 62, and a third lens 63 stacked in sequence. In one embodiment, the lenses of the lens group 60 are made of resin.

The switching mechanism 70 switches an imaging direction of the camera module 100. In one embodiment, the switching mechanism 70 includes a switching base 71, an optical path conversion member 72, and a driving member 73.

Figure 3:
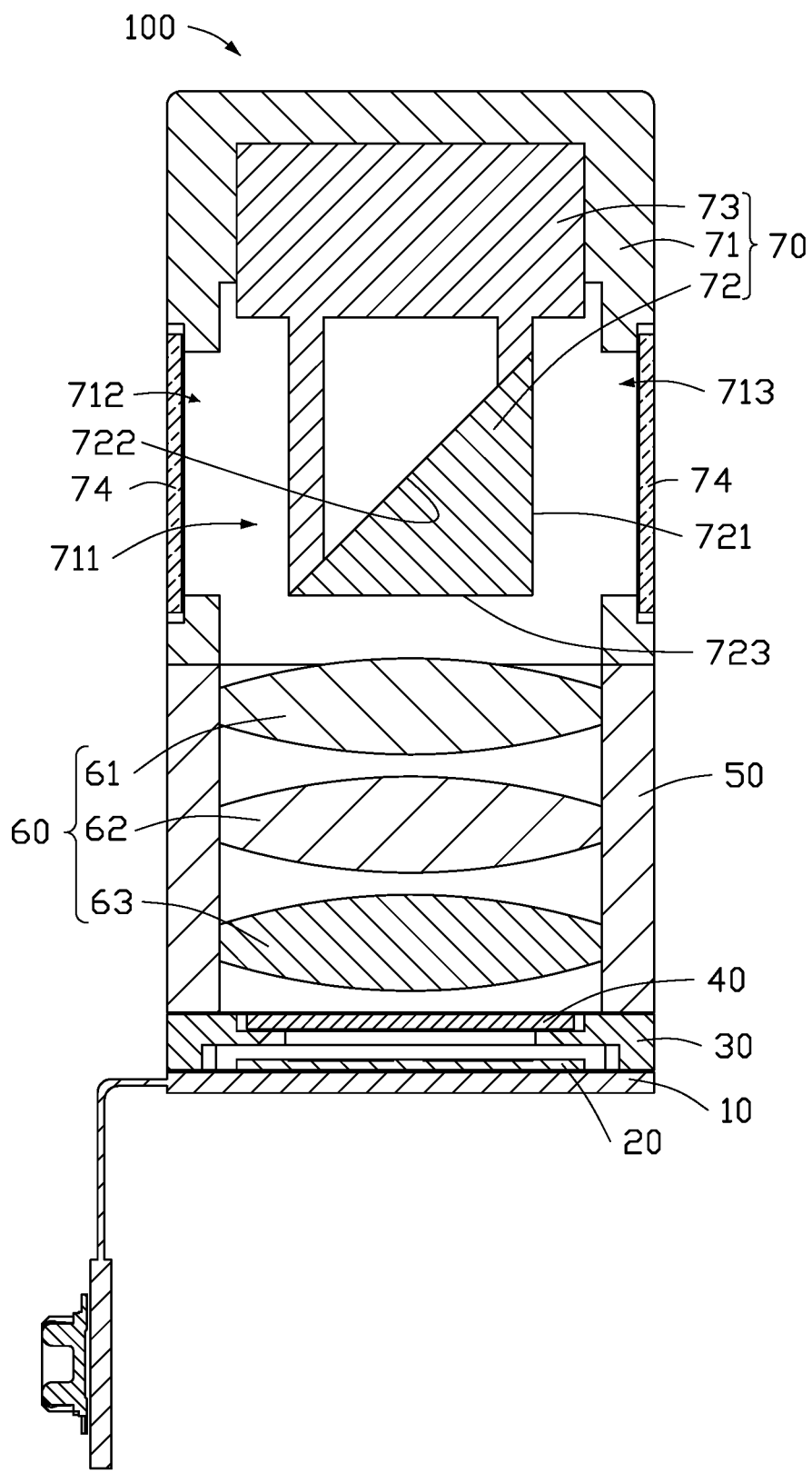
FIG. 3 is a cross-sectional view taken along line III-III in FIG. 1.
Figure 4:
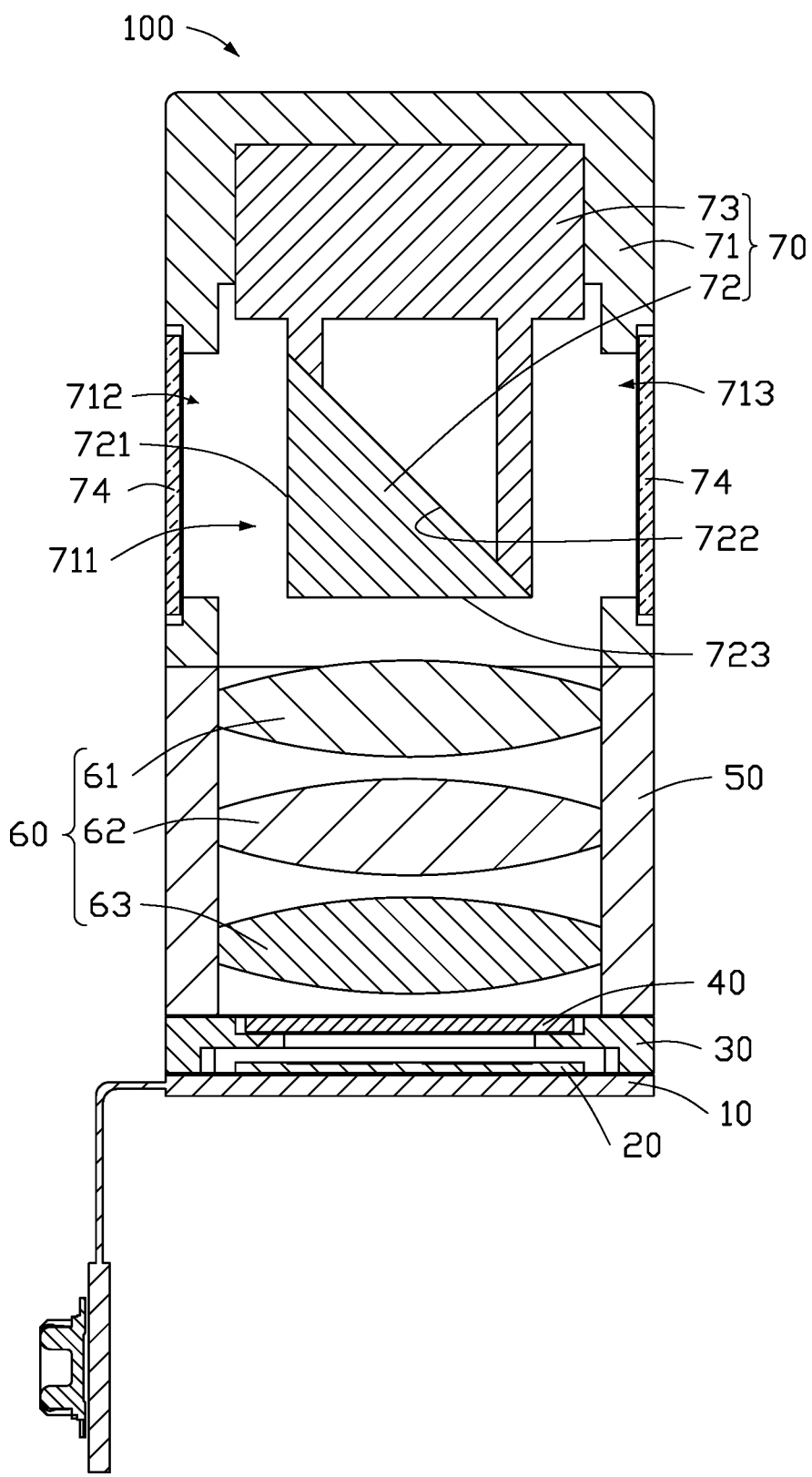
FIG. 4 is similar to FIG. 3, but showing the camera module in another state of use.

Referring to FIG. 3 and FIG. 4, the switching base 71 is mounted to a surface of the lens base 50 facing away from the circuit board 10 by a hollow glue layer. The switching base 71 is substantially a cuboid housing, and a light guide cavity 711 is defined in a side of the lens base 50. The light guide cavity 711 is aligned with the through hole 51. The switching base 71 further defines a front aperture 712 and a rear aperture 713. The front aperture 712 is opposite to the rear aperture 713, and the front aperture 712 and the rear aperture 713 communicate with the light guide cavity 711. In one embodiment, the switching mechanism 70 further includes two protective glass plates 74. The two protective glass plates 74 are respectively disposed over the front aperture 712 and the rear aperture 713 to seal the light guide cavity 711.

In one embodiment, the optical path conversion member 72 is an isosceles right angle triangular prism and includes a light incident surface 721, a reflective surface 722, and a light output surface 723. The light incident surface 721 and the light output surface 723 are respective tangent sides of the optical path conversion member 72, and the reflective surface 722 is a hypotenuse side of the optical path conversion member 72. The light incident surface 721 is positioned facing the front aperture 712 or the rear aperture 713. The reflective surface 722 reflects light entering through the light incident surface 721 to the light output surface 723. The light output surface 723 is positioned facing the lens group 60.

It can be understood that in other embodiments, the optical path conversion member 72 can be a planar mirror.

The driving member 73 is disposed on a wall of the light guide cavity 711 facing away from the lens base 50, and a driving end of the driving member 73 is coupled to the optical path conversion member 72. The driving member 73 drives the optical path conversion member 72 to rotate around a main optical axis of the lens group 60 to position the light incident surface 721 facing the front aperture 712 or the rear aperture 713. In one embodiment, the driving member 73 is a rotating motor. Two driving ends of the driving member 73 are fixed to an outer surface of the reflective surface 722 by a glue layer.

When a front camera function is required, the light incident surface 721 is positioned facing the front aperture 712, and light entering through the front aperture 712 and the light incident surface 721 is reflected by the reflective surface 722 to the light output surface 723, and then projected onto the photosensitive chip 20 through the filter 40. The photosensitive chip 20 converts an optical signal projected to a surface thereof into an electrical signal and outputs the electrical signal to the circuit board 10. The circuit board 10 processes the electrical signal to obtain a desired image. The camera module 100 can be connected to other components of the electronic device through the electrical connection portion 11.

When a rear camera function is required, the driving member 73 drives the optical path conversion member 72 to rotate to position the light incident surface 721 facing the rear aperture 713. Light entering through the rear aperture 713 and the light incident surface 721 is reflected by the reflective surface 722 to the light output surface 723, and then projected onto the photosensitive chip 20 through the filter 40. The photosensitive chip 20 converts an optical signal projected to a surface thereof into an electrical signal and outputs the electrical signal to the circuit board 10. The circuit board 10 processes the electrical signal to obtain a desired image.

It can be understood that in other embodiments, a side aperture may be defined in side surfaces of the switching base 71 perpendicular to the sides defining the front aperture 712 and the rear aperture 713, so that light can enter the light guide cavity 711, and the camera module 100 can capture images from the side.

The camera module 100 may be implemented in a mobile phone, a notebook computer, a desktop computer, a game console, or the like.

Since the switching mechanism 70 is mounted on the lens group 60, the optical path conversion member 72 is driven to rotate by the driving member 73, so that objects in both front and rear directions can be reflected by the reflective surface 722 into the camera module 100, and the camera module 100 can realize the function of front and rear imaging. The camera module 100 has a simple structure and can have high pixel performance for both front and rear imaging, so that a quality of captured photos is higher, and a cost of the camera module 100 can be effectively reduced.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including in matters of shape, size and arrangement of the parts within the principles of the present disclosure up to, and including, the full extent established by the broad general meaning of the terms used in the claims.

What is claimed is:

1. A camera module comprising:
   a lens base defining a through hole passing through the lens base;
   a lens group mounted and received within the through hole;
   a switching mechanism comprising a switching base, an optical path conversion member, and a driving member; wherein the switching base is mounted on the lens base and defines a light guide cavity communicating with the through hole;
   the switching base defines a front aperture and a rear aperture communicating with the light guide cavity, the rear aperture opposite to the front aperture;
   the front aperture and the rear aperture communicate with the light guide cavity;
   the optical path conversion member comprises a reflective surface;
   the driving member and the optical light conversion member are mounted within the light guide cavity, the driving member is coupled to the optical light conversion member and drives the optical light conversion member to rotate to cause the reflective surface to reflect light entering through the front aperture or the rear aperture to the lens group.

2. The camera module of claim 1, wherein:
   the driving member drives the optical light conversion member to rotate around a main optical axis of the lens group.

3. The camera module of claim 1, wherein:
   the optical path conversion member is an isosceles right angle triangular prism comprising a light incident surface and a light output surface;
   the light incident surface and the light output surface are respective tangent sides of the optical path conversion member, and the reflective surface is a hypotenuse side of the optical path conversion member;

the light incident surface is positioned facing the front aperture or the rear aperture;

the light output surface is positioned facing the lens group.

4. The camera module of claim 1, wherein:
the optical path conversion member is a planar mirror.

5. The camera module of claim 1, wherein:
the front aperture and the rear aperture are defined in respective opposite sides of the switching base.

6. The camera module of claim 1, wherein:
the switching mechanism further comprises two protective glass plates respectively covering the front aperture and the rear aperture.

7. The camera module of claim 1, wherein:
the driving member is a rotating motor;
the driving member is mounted on a surface of the light guide cavity facing away from the lens base;
a driving end of the driving member is coupled to the optical light conversion member.

8. The camera module of claim 1, wherein:
the lens group comprises a circuit board, a photosensitive chip mounted on the circuit board, and a mounting bracket mounted on the circuit board;
the photosensitive chip is received within the mounting bracket;
the lens base is mounted on the mounting bracket; and
the switching base is mounted on a surface of the lens base facing away from the circuit board.

9. The camera module of claim 8, further comprising a filter, wherein:
the mounting bracket defines a receiving hole passing through the mounting bracket;
the filter covers the receiving hole.

10. A camera module comprising:
a lens base defining a through hole passing through the lens base;
a lens group mounted and received within the through hole;
a switching mechanism comprising a switching base, an optical path conversion member, and a driving member; wherein;
the switching base is mounted on the lens base and defines a light guide cavity aligned with a side of the lens base and communicating with the through hole;

the switching base defines a front aperture and a rear aperture communicating with the light guide cavity, the rear aperture opposite to the front aperture;

the optical path conversion member comprises a reflective surface, a light incident surface, and a light output surface;

the driving member and the optical light conversion member are mounted within the light guide cavity;

the driving member is coupled to the optical light conversion member and drives the optical light conversion member to rotate to position the light incident surface facing the front aperture or the rear aperture;

the reflective surface reflects light entering through the front aperture or the rear aperture to the lens group.

11. The camera module of claim 10, further comprising a photosensitive chip, wherein:
the circuit board comprises a first hard board portion, a second hard board portion, and a soft board portion;
the soft board portion is coupled between the first hard board portion and the second hard board portion;
the photosensitive chip is mounted to the first hard board portion.

12. The camera module of claim 11, wherein:
the photosensitive chip is a complementary metal-oxide semiconductor (CMOS) chip or a charge coupled device (CCD) chip.

13. The camera module of claim 10, wherein:
the lens group comprises a first lens, a second lens, and a third lens stacked in sequence and aligned with the photosensitive chip.

14. The camera module of claim 10, wherein:
the driving member drives the optical light conversion member to rotate around a main optical axis of the lens group.

15. The camera module of claim 14, wherein:
the front aperture and the rear aperture are defined in respective opposite sides of the switching base.

16. The camera module of claim 15, wherein:
the driving member is a rotating motor;
the driving member is mounted on a surface of the light guide cavity facing away from the lens base;
a driving end of the driving member is coupled to the optical light conversion member.

* * * * *